US 9,619,044 B2

(12) United States Patent
Tenuta

(10) Patent No.: US 9,619,044 B2
(45) Date of Patent: Apr. 11, 2017

(54) CAPACITIVE AND RESISTIVE-PRESSURE TOUCH-SENSITIVE TOUCHPAD

(71) Applicant: GOOGLE INC., Mountain View, CA (US)

(72) Inventor: Matthew Dominic Tenuta, San Jose, CA (US)

(73) Assignee: Google Inc., Mountain View, CA (US)

( * ) Notice: Subject to any disclaimer, the term of this patent is extended or adjusted under 35 U.S.C. 154(b) by 124 days.

(21) Appl. No.: 14/048,430

(22) Filed: Oct. 8, 2013

(65) Prior Publication Data

US 2015/0084868 A1    Mar. 26, 2015

Related U.S. Application Data

(60) Provisional application No. 61/882,333, filed on Sep. 25, 2013.

(51) Int. Cl.
*G06F 3/044* (2006.01)
*G06F 3/02* (2006.01)
(Continued)

(52) U.S. Cl.
CPC ............ *G06F 3/0213* (2013.01); *G06F 3/038* (2013.01); *G06F 3/03547* (2013.01);
(Continued)

(58) Field of Classification Search
CPC combination set(s) only.
See application file for complete search history.

(56) References Cited

U.S. PATENT DOCUMENTS 5,525,980 A * 6/1996 Jahier ................ G06F 3/044
                                                  341/22
5,815,141 A * 9/1998 Phares ............... G06F 3/045
                                                  178/18.05
(Continued)

FOREIGN PATENT DOCUMENTS

DE    102012201379 A1    8/2013
WO    2011/156447 A1    12/2011

OTHER PUBLICATIONS

International Search Report and Written Opinion for PCT Patent Application No. PCT/US2014/054722, mailed on Dec. 10, 2014, 13 pages.

*Primary Examiner* — Chad Dicke
(74) *Attorney, Agent, or Firm* — Brake Hughes Bellermann LLP

(57) ABSTRACT

A trackpad device includes a top surface, a capacitive sensor operably coupled to the top surface, a resistive sensor disposed below the capacitive sensor and at least one controller operably coupled to the capacitive sensor and to the resistive sensor. The at least one controller and the capacitive sensor are configured to detect one or more objects on the top surface. The at least one controller and the resistive sensor are configured to detect the one or more objects on the top surface independent of the detection by the at least one controller and the capacitive sensor. The at least one controller is configured to determine locations of the one or more objects on the top surface using information from the detection by the at least one controller and capacitive sensor and information from the detection by the at least one controller and the resistive sensor.

18 Claims, 8 Drawing Sheets

(51) Int. Cl.
  *G06F 3/045* (2006.01)
  *G06F 3/038* (2013.01)
  *G06F 3/041* (2006.01)
  *G06F 3/0354* (2013.01)

(52) U.S. Cl.
  CPC .............. *G06F 3/044* (2013.01); *G06F 3/045* (2013.01); *G06F 3/0418* (2013.01); *G06F 2203/04105* (2013.01); *G06F 2203/04106* (2013.01)

(56) References Cited

U.S. PATENT DOCUMENTS

| | | | | |
|---|---|---|---|---|
| 6,492,979 | B1* | 12/2002 | Kent | G06F 3/0414 178/18.01 |
| 7,152,482 | B2 | 12/2006 | Ueno et al. | |
| 7,394,458 | B2 | 7/2008 | Lyon et al. | |
| 8,049,736 | B2 | 11/2011 | Lyon et al. | |
| 8,179,376 | B2* | 5/2012 | Griffin | G06F 3/0416 345/157 |
| 8,294,686 | B2* | 10/2012 | Townsend | G06F 3/0416 340/407.1 |
| 8,633,916 | B2* | 1/2014 | Bernstein | G06F 3/016 340/407.2 |
| 8,654,524 | B2* | 2/2014 | Pance | G06F 1/1616 345/177 |
| 8,797,295 | B2* | 8/2014 | Bernstein | G06F 3/016 340/407.2 |
| 2002/0054025 | A1* | 5/2002 | Komata | G11B 19/02 345/173 |
| 2004/0108995 | A1* | 6/2004 | Hoshino | F16M 11/10 345/173 |
| 2004/0178995 | A1* | 9/2004 | Sterling | G06F 3/044 345/173 |
| 2006/0290677 | A1 | 12/2006 | Lyon et al. | |
| 2007/0043725 | A1* | 2/2007 | Hotelling | G06F 3/016 |
| 2007/0152976 | A1* | 7/2007 | Townsend | G06F 3/0416 345/173 |
| 2007/0205995 | A1* | 9/2007 | Woolley | B25J 13/084 345/173 |
| 2007/0229464 | A1 | 10/2007 | Hotelling et al. | |
| 2007/0247431 | A1 | 10/2007 | Skillman et al. | |
| 2007/0268275 | A1* | 11/2007 | Westerman | G06F 3/0235 345/173 |
| 2008/0048990 | A1 | 2/2008 | Cho et al. | |
| 2008/0158145 | A1 | 7/2008 | Westerman | |
| 2008/0231605 | A1* | 9/2008 | Yang | G06F 3/0416 345/173 |
| 2009/0027353 | A1* | 1/2009 | Im | G06F 3/0414 345/173 |
| 2009/0065267 | A1* | 3/2009 | Sato | G01L 1/20 178/18.06 |
| 2009/0073134 | A1 | 3/2009 | Huang et al. | |
| 2009/0096762 | A1* | 4/2009 | Hinata | G06F 3/045 345/174 |
| 2009/0140987 | A1* | 6/2009 | Yang | G06F 3/041 345/173 |
| 2009/0194341 | A1* | 8/2009 | Nousiainen | G06F 1/3203 178/18.01 |
| 2009/0219257 | A1 | 9/2009 | Frey et al. | |
| 2009/0237374 | A1 | 9/2009 | Li et al. | |
| 2009/0244014 | A1* | 10/2009 | Hotelling | G06F 3/0416 345/173 |
| 2009/0256817 | A1* | 10/2009 | Perlin | G06F 3/0233 345/174 |
| 2009/0309616 | A1* | 12/2009 | Klinghult | G06F 3/044 324/686 |
| 2010/0053087 | A1 | 3/2010 | Dai et al. | |
| 2010/0053095 | A1* | 3/2010 | Wu | G06F 3/0488 345/173 |
| 2010/0259482 | A1* | 10/2010 | Ball | G06F 3/0219 345/168 |
| 2011/0012855 | A1* | 1/2011 | Yeh | G06F 3/0416 345/173 |
| 2011/0037722 | A1* | 2/2011 | Tseng | G06F 3/0416 345/174 |
| 2011/0050619 | A1* | 3/2011 | Griffin | G06F 3/0416 345/174 |
| 2011/0115732 | A1 | 5/2011 | Coni et al. | |
| 2011/0134071 | A1* | 6/2011 | Kim | G06F 3/041 345/174 |
| 2011/0141052 | A1* | 6/2011 | Bernstein | G06F 3/016 345/174 |
| 2011/0148770 | A1* | 6/2011 | Adamson | G06F 3/04883 345/173 |
| 2011/0227872 | A1 | 9/2011 | Huska et al. | |
| 2011/0234508 | A1* | 9/2011 | Oda | G06F 3/044 345/173 |
| 2011/0254762 | A1* | 10/2011 | Dahl | G06F 3/0346 345/156 |
| 2012/0007614 | A1* | 1/2012 | Yeh | G06F 3/045 324/658 |
| 2012/0019448 | A1* | 1/2012 | Pitkanen | G06F 1/1662 345/173 |
| 2012/0019468 | A1* | 1/2012 | Westerman | G06F 3/017 345/173 |
| 2012/0086667 | A1 | 4/2012 | Coni et al. | |
| 2012/0092295 | A1* | 4/2012 | Hirai | G06F 3/044 345/174 |
| 2012/0206401 | A1* | 8/2012 | Lin | G06F 3/044 345/174 |
| 2012/0299866 | A1* | 11/2012 | Pao | G06F 3/044 345/174 |
| 2013/0002534 | A1* | 1/2013 | Braun | G06F 1/163 345/156 |
| 2013/0015906 | A1* | 1/2013 | Yeh | G06F 3/044 327/517 |
| 2013/0044070 | A1* | 2/2013 | Townsend | G06F 3/0416 345/174 |
| 2013/0093692 | A1* | 4/2013 | Wang | G06F 3/0416 345/173 |
| 2013/0141364 | A1* | 6/2013 | Lynn | G06F 3/041 345/173 |
| 2013/0229380 | A1* | 9/2013 | Lutz, III | G06F 1/1618 345/173 |
| 2013/0342501 | A1* | 12/2013 | Molne | G06F 3/0414 345/174 |
| 2014/0085247 | A1* | 3/2014 | Leung | G06F 3/0414 345/174 |
| 2014/0139442 | A1* | 5/2014 | Clayton | G06F 3/03547 345/173 |
| 2014/0152561 | A1* | 6/2014 | Qian | G06F 3/04886 345/158 |
| 2014/0347315 | A1* | 11/2014 | Mo | G06F 3/044 345/174 |
| 2015/0082158 | A1* | 3/2015 | VanBlon | G06F 17/276 715/261 |

\* cited by examiner

CAPACITIVE AND RESISTIVE-PRESSURE TOUCH-SENSITIVE TOUCHPAD

CROSS REFERENCE TO RELATED APPLICATIONS

This application claims the benefit of U.S. Provisional Application No. 61/882,333, filed Sep. 25, 2013, entitled "Pressure-Sensitive Trackpad," which is hereby incorporated by reference in its entirety.

TECHNICAL FIELD

This document relates, generally, to trackpad (touchpad) pointing devices.

BACKGROUND

Trackpads, which may also be referred to as touchpads, are often used with computing devices, e.g., as pointing devices to facilitate user interaction with an associated computing device. Trackpads may be used with a computing device in place of, or in addition to, a mouse pointing device. For instance, trackpads are often implemented as integrated pointing devices for laptop computing devices, notebook computing devices and netbook computing devices. A trackpad may also be implemented as a non-integrated device that is coupled (e.g., as a peripheral device) to a computing device, such as a desktop computing device or a server computing device, as some examples. Trackpads may, of course, be implemented in other devices as well.

Trackpad (touchpad) devices include a tactile sensing surface (e.g., a capacitive sensing surface), where the trackpad device is generally configured to facilitate interaction by a user with a graphical user interface (GUI) for an associated computing device. For instance, a trackpad device may be configured to detect position and motion of a user's finger or fingers that are in contact with the tactile sensing surface. The detected motion and/or position of a user's finger or fingers on the trackpad may then be used, by the computing device, to determine a relative position on a display screen (in a GUI) that corresponds with the position of the user's finger (or fingers), or to affect movement of a cursor in the GUI, as some examples.

Current trackpads, however, have certain drawbacks. For instance, in some implementations, a user tapping a trackpad's surface may be used to indicate a mouse click, such as to select an item, locate a cursor or launch a program, as some examples. However, in such approaches, a user inadvertently and briefly touching the trackpad may be recognized as unwanted mouse click, which can result in undesired effects and be frustrating for the user. In other instances, a trackpad device may include separate buttons. In such implementations, a user may have to position his or her finger on the trackpad surface and simultaneously click one of the separate buttons in order to perform certain interactions with a GUI (such as to launch an application associated with an icon, select an object in the GUI or move an object in the GUI, as some examples), which may be awkward for the user.

SUMMARY

In a general aspect, a trackpad device includes a top surface, a capacitive sensor operably coupled to the top surface, a resistive sensor disposed below the capacitive sensor and at least one controller operably coupled to the capacitive sensor and to the resistive sensor. The at least one controller and the capacitive sensor are configured to detect one or more objects on the top surface. The at least one controller and the resistive sensor are configured to detect the one or more objects on the top surface independent of the detection by the at least one controller and the capacitive sensor. The at least one controller is configured to determine locations of the one or more objects on the top surface using information from the detection by the at least one controller and capacitive sensor and information from the detection by the at least one controller and the resistive sensor.

Implementations may include one or more of the following features. For example, the resistive sensor may include a top resistive layer, a bottom resistive layer and a spacer matrix disposed between the top resistive layer and the bottom resistive layer, where the at least one controller and the resistive sensor are configured to detect the one or more objects on the top surface by measuring a force applied by the one or more objects using the top resistive layer, the bottom resistive layer and the spacer matrix.

The at least one controller may include a first controller that is operably coupled to the capacitive sensor and a second controller that is operably coupled to the resistive sensor, where the first controller is different from the second controller. The trackpad device may further include a synchronizer that is operably coupled to the first controller and the second controller. The synchronizer may be configured to synchronize detection scans from the first controller and the capacitive sensor with detection scans from the second controller and the resistive sensor. The synchronizer may be configured to run the detection scans from the first controller and the capacitive sensor simultaneously with the detection scans from the second controller and the resistive sensor.

The top surface may be divided into a plurality of regions and the at least one controller may be configured to determine the locations of the one or more objects on the top surface by using the detections with the capacitive sensor in one or more of the regions to filter the detections with the resistive sensor in the same regions. The capacitive sensor may be a single layer capacitive sensor. The capacitive sensor may be a multi-layer capacitive sensor. The trackpad device may include both a trackpad area and a keyboard area and the at least one controller may be configured to use the capacitive sensor and the resistive sensor to distinguish between keystrokes on the keyboard area and movement on the trackpad area. At least a portion of the trackpad area and the keyboard area may overlap.

In another general aspect, a computing device includes a display device, where the computing device is configured to render a graphical user interface (GUI) on the display device. The computing device includes a trackpad apparatus configured to facilitate user interaction with the GUI. The trackpad apparatus includes a top surface, a capacitive sensor operably coupled to the top surface, a resistive sensor disposed below the capacitive sensor and at least one controller operably coupled to the capacitive sensor and to the resistive sensor. The at least one controller and the capacitive sensor are configured to detect one or more objects on the top surface. The at least one controller and the resistive sensor are configured to detect the one or more objects on the top surface independent of the detection by the at least one controller and the capacitive sensor. The at least one controller is configured to determine locations of the one or more objects on the top surface using information from the detection by the at least one controller and capacitive sensor and information from the detection by the at least one controller and the resistive sensor.

Implementations may include one or more of the following features. For example, the at least one controller and the resistive sensor may be collectively further configured to, for one or more corresponding locations on the top surface of the trackpad apparatus, detect a respective amount of pressure applied to the top surface of the trackpad apparatus and user interaction with the GUI may be further based on the detected respective amounts of pressure for the one or more corresponding locations on the top surface of the trackpad apparatus. The resistive sensor may include a top resistive layer, a bottom resistive layer and a spacer matrix disposed between the top resistive layer and the bottom resistive layer, where the at least one controller and the resistive sensor are configured to detect the one or more objects on the top surface by measuring a force applied by the one or more objects using the top resistive layer, the bottom resistive layer and the spacer matrix.

The at least one controller may include a first controller that is operably coupled to the capacitive sensor and a second controller that is operably coupled to the resistive sensor, where the first controller is different from the second controller. The computing device may further include a synchronizer that is operably coupled to the first controller and the second controller, where the synchronizer may be configured to synchronize detection scans from the first controller and the capacitive sensor with detection scans from the second controller and the resistive sensor. The synchronizer may be configured to run the detections scans from the first controller and the capacitive sensor simultaneously with the detection scans from the second controller and the resistive sensor.

The trackpad apparatus may include both a trackpad area and a keyboard area and the at least one controller may be configured to use the capacitive sensor and the resistive sensor to distinguish between keystrokes on the keyboard area and movement on the trackpad area. At least a portion of the trackpad area and the keyboard area may overlap.

In another general aspect, a method includes detecting one or more objects on a top surface of a trackpad device using at least one controller and a capacitive sensor, detecting one or more objects on the top surface using the at least one controller and a resistive sensor independent of the detection by the at least one controller and the capacitive sensor and determining locations of the one or more objects on the top surface using information from the detection by the at least one controller and capacitive sensor and information from the detection by the at least one controller and the resistive sensor.

Implementations may include one or more of the following features. For example, the trackpad device may include both a trackpad area and a keyboard area and the method further includes distinguishing between keystrokes on the keyboard area and movement on the trackpad area using the capacitive sensor and the resistive sensor.

In another general aspect, an apparatus includes means for detecting one or more objects on a top surface of a trackpad device using at least one controller and a capacitive sensor, means for detecting one or more objects on the top surface using the at least one controller and a resistive sensor independent of the detection by the at least one controller and the capacitive sensor and means for determining locations of the one or more objects on the top surface using information from the detection by the at least one controller and capacitive sensor and information from the detection by the at least one controller and the resistive sensor.

Implementations may include one or more of the following features. For example, the trackpad device may include both a trackpad area and a keyboard area and the method further includes means for distinguishing between keystrokes on the keyboard area and movement on the trackpad area using the capacitive sensor and the resistive sensor.

The details of one or more implementations are set forth in the accompanying drawings and the description below. Other features will be apparent from the description and drawings, and from the claims.

DETAILED DESCRIPTION

Figure 1A:
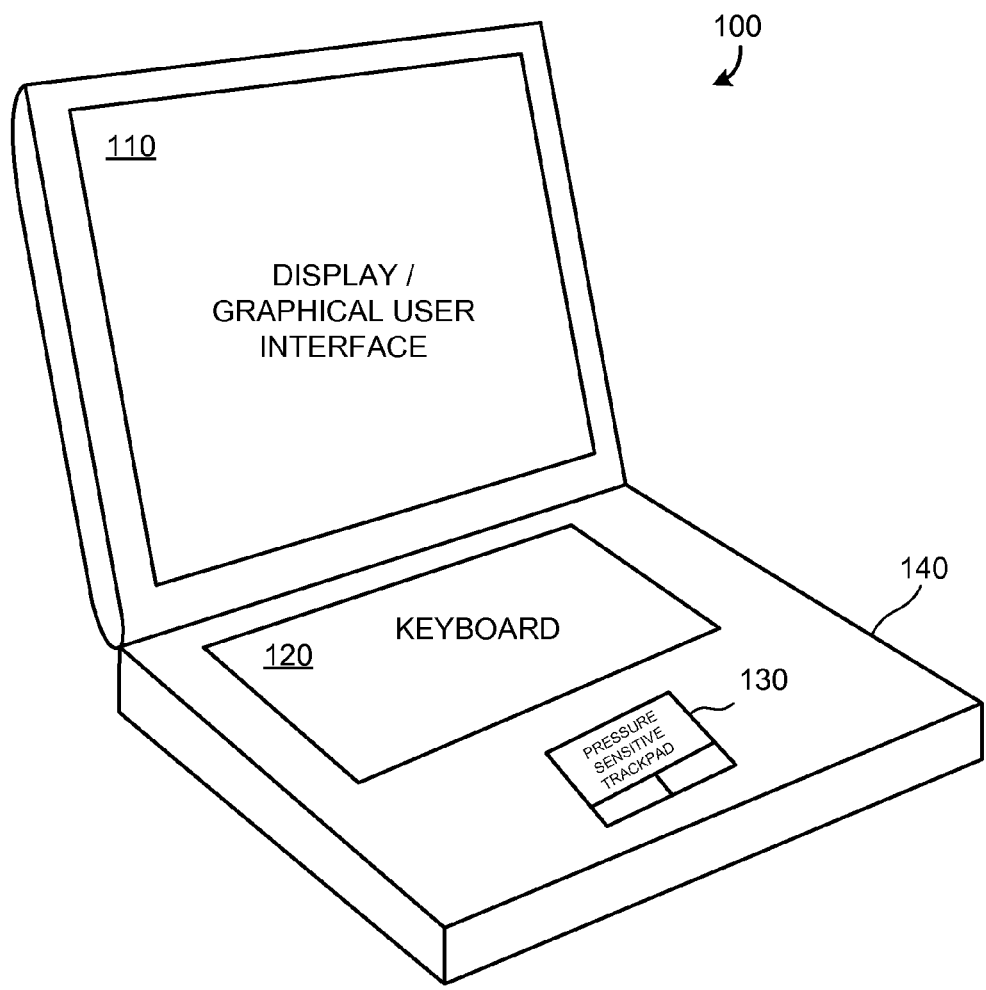
FIG. 1A is a drawing illustrating a computing device in accordance with an example implementation.

FIG. 1A is a drawing illustrating a computing device 100 in accordance with an example implementation. It will be appreciated that the computing device 100 is shown by way of example, and for purposes of illustration. In some implementations, the computing device 100 may take the form of a laptop computer, a notebook computer or netbook computer. In other implementations, the computing device 100 may have other configurations. For instance, the computing device 100 may be a tablet computer, a desktop computer, a server computer, or a number of other computing or electronics devices where a pressure-sensitive trackpad apparatus (trackpad device) 130, such as those described herein, may be used to facilitate interaction with a corresponding device (e.g., via a graphical user interface (GUI)). Throughout this document, the terms trackpad, trackpad device, trackpad apparatus, touchpad, touchpad device and touchpad apparatus may be used interchangeably. Also throughout this document, the terms computing device, computing system and electronic device may be used interchangeably.

The computing device 100 shown in FIG. 1A includes a display device 110, a keyboard 120, a pressure-sensitive trackpad apparatus 130 and a chassis 140. As indicated in FIG. 1A, the display device 110 (e.g., in conjunction with other elements of the computing device 100) may be configured to render a GUI that allows a user to interact with the computing device 100, such as to run programs, browse the Internet or World Wide Web, or draft documents, as some examples. A user of the computing device 100 may interact with the computing device 100 via the GUI rendered on the display device 110 using the keyboard 120, such as to enter text or commands. The keyboard 120 may take a number of forms, and the particular arrangement of the keyboard 120 will depend on the particular implementation.

A user may also interact with the computing device 100 via the GUI rendered on the display device 110 using the pressure-sensitive trackpad 130, such as to move a cursor, select objects, launch programs from icons or move objects in the GUI, as some examples. Of course, other interactions with the GUI are possible using the pressure-sensitive trackpad 130. The trackpad 130 may be implemented in a number of ways, such as using the techniques described herein, for example. It will be appreciated that the particular configuration of the trackpad 130 may vary and the configuration used will depend on the specific implementation. For instance, the trackpad may be larger, or smaller in some implementations. For example, in one implementation, the trackpad may be increased in size and be disposed in (replace) the area that includes the keyboard 120, such as described below with respect to FIG. 1B.

The chassis 140 of the computing device 100 may be used to house various components of the computing device 110, such as the trackpad 130, a processor motherboard and system memory (e.g., including volatile and non-volatile memory), as well as a number of other components. The chassis 140 may also be used to establish an electrical ground, which may also be referred to as chassis ground, for one or more components of the computing device 100, such as for the trackpad 130. For instance, in one example, the chassis 140 may comprise a metal frame within a polymer housing. In this example, the metal frame of the chassis 140 may be connected to an electrical ground of a power supply that is included in the computing device 100 in order to provide electrical (chassis) ground to the trackpad 130. It will be appreciated that other arrangements for providing a chassis ground are possible.

Figure 1B:
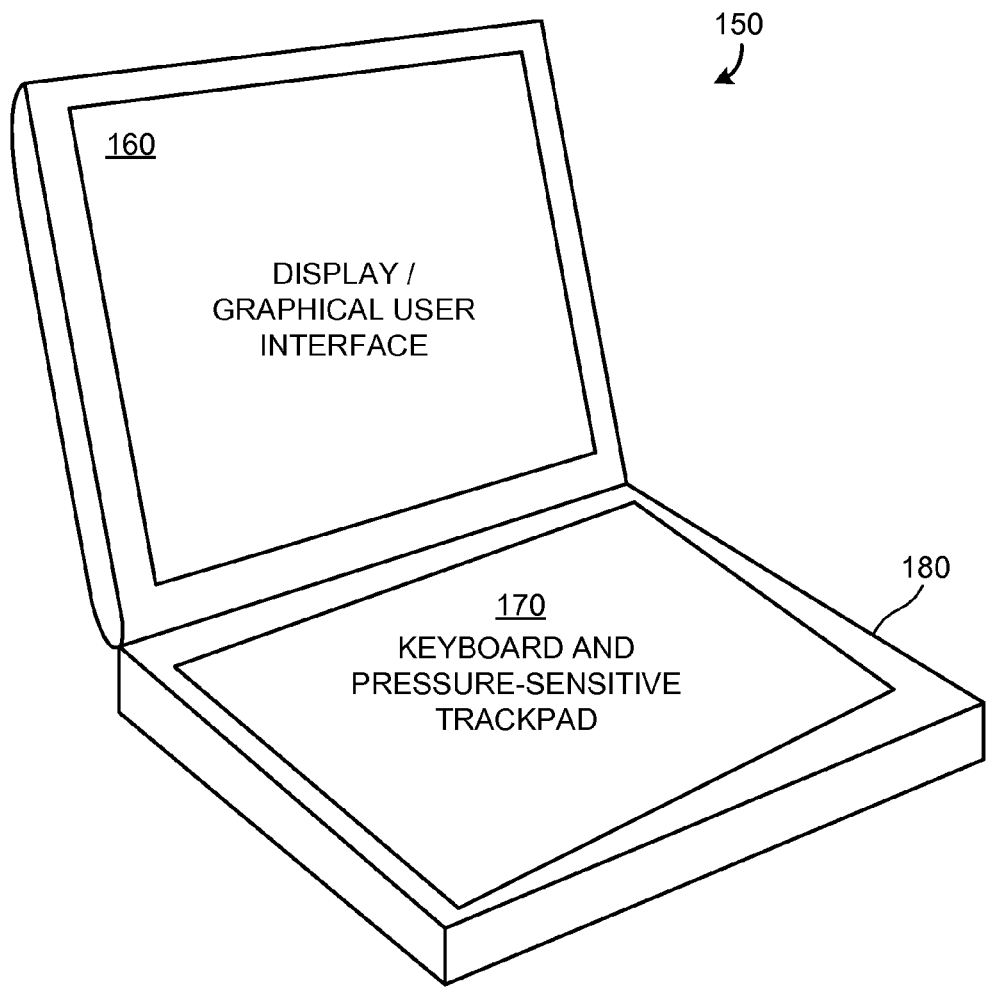
FIG. 1B is a drawing illustrating a computing device in accordance with an example implementation.

FIG. 1B is a drawing illustrating a computing device 150 in accordance with an example implementation. It will be appreciated that the computing device 150 is shown by way of example, and for purposes of illustration. In some implementations, the computing device 150 may take the form of a laptop computer, a notebook computer or netbook computer. In other implementations, the computing device 150 may have other configurations. For instance, the computing device 150 may be a tablet computer, a desktop computer, a server computer, or a number of other computing or electronics devices where a combined keyboard and pressure-sensitive trackpad apparatus (trackpad device) 170, such as those described herein, may be used to facilitate interaction with a corresponding device (e.g., via a graphical user interface (GUI)).

The computing device 150 shown in FIG. 1B includes a display device 160, a combined keyboard and pressure-sensitive trackpad apparatus 170 and a chassis 180. As indicated in FIG. 1B, the display device 160 (e.g., in conjunction with other elements of the computing device 150) may be configured to render a GUI that allows a user to interact with the computing device 150, such as to run programs, browse the Internet or World Wide Web, or draft documents, as some examples. A user of the computing device 150 may interact with the computing device 150 via the GUI rendered on the display device 160 using the combined keyboard and pressure-sensitive trackpad 170. For instance, the user may use the keyboard and trackpad 170 both to enter text or commands and for actions such as moving a cursor, selecting objects, launching programs from icons or moving objects in the GUI, as some examples. The keyboard and trackpad 170 may take a number of forms, and the particular arrangement of the keyboard and trackpad 170 will depend on the particular implementation. The keyboard and trackpad 170 may be implemented in a number of ways, such as using the techniques described herein, for example.

It will be appreciated that the particular configuration of the keyboard and trackpad 170 may vary and the configuration used will depend on the specific implementation. For instance, keyboard and trackpad 170 may be configured to function as both the keyboard and the trackpad and the keyboard and trackpad 170 may be configured to distinguish between keyboard actions and trackpad actions.

The chassis 180 of the computing device 150 may be used to house various components of the computing device 150, such as the keyboard and trackpad 170, a processor motherboard and system memory (e.g., including volatile and non-volatile memory), as well as a number of other components. The chassis 180 may also be used to establish an electrical ground, which may also be referred to as chassis ground, for one or more components of the computing device 150, such as for the keyboard and trackpad 170. For instance, in one example, the chassis 180 may comprise a metal frame within a polymer housing. In this example, the metal frame of the chassis 180 may be connected to an electrical ground of a power supply that is included in the computing device 150 in order to provide electrical (chassis) ground to the keyboard and trackpad 170. It will be appreciated that other arrangements for providing a chassis ground are possible.

Figure 2A:
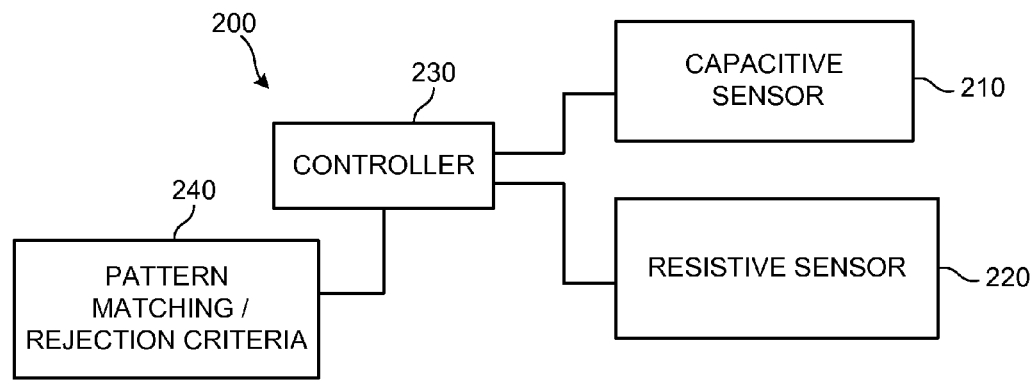
FIG. 2A is a block diagram illustrating a pressure-sensitive trackpad apparatus in accordance with an example implementation.

FIG. 2A is a block diagram illustrating a pressure-sensitive trackpad apparatus 200 in accordance with an example implementation. The trackpad 200 may be implemented, for example, in the computing device 100 as the trackpad apparatus 130 and in the computing device 150 as the keyboard and trackpad apparatus 170. Of course, the trackpad 200 may be implemented in conjunction with other computing devices and the computing devices 100 and 150 may include pressure-sensitive trackpads having other configurations. For example, FIG. 2A illustrates a single controller 230. In other example implementations, more than one controller may be used, for instance as discussed below in more detail below with respect to FIG. 2B.

As shown in FIG. 2A, the trackpad apparatus 200 includes a capacitive sensor 210 (also referred to as a capacitive touch-sensing pattern), a resistive sensor 220 (also referred to as a resistive touch-sensing pattern), a controller 230 and pattern matching/rejection criteria 240. It will be appreciated that the configuration of the trackpad 200 is given by way of example and for purposes of illustration. In certain implementations, the trackpad 200 may include other elements, or may be arranged in different fashions. For instance, the trackpad 200 may include an insulating layer that is disposed between the capacitive sensor 210 and the resistive sensor 220. In other instances, the pattern matching/rejection criteria 240 may be included in the controller 230. In still other implementations, pattern matching and/or pattern rejection, such as described herein, may be performed by other elements of a computing system (e.g., other than the controller 230) in which the trackpad 200 is implemented.

In the trackpad 200, the capacitive sensor 210 may be disposed on a top surface of the trackpad 200 and provide a tactile sensing surface for detecting (e.g., in conjunction with the controller 230) the presence and/or movement of one or more electrically conductive and electrically grounded objects, such as a user's finger or fingers, for example. In an example implementation, the capacitive sensor 210 may be implemented using a multi-layer array (matrix) of capacitors. In such an approach, the capacitive sensor 210 may include a top layer of closely-spaced, parallel-arranged conductors and a bottom layer of closely-spaced, parallel-arranged conductors that are oriented in a perpendicular arrangement with the conductors of the top layer. The top layer and the bottom layer of the capacitive sensor 210 may be separated by an insulating (dielectric) layer, such that the conductors in the top layer and the bottom layer form respective capacitors, through the dielectric layer, at each crossing point of a conductor in the top layer and a conductor in the bottom layer. Such an arrangement may be used to form a tightly spaced matrix of capacitors. In one example implementation, the capacitive sensor 210 may be a single layer sensor. In other example implementations, the capacitive sensor 210 may be a multi-layer capacitive sensor.

In such an approach, the controller 230 may be configured to sequentially apply a high frequency signal (e.g., an alternating current (AC) signal) between conductor pairs in such a two-dimensional capacitor matrix. The amount of charge that is coupled through the capacitors at each crossing point of the conductors of the top layer and the conductors of the bottom layer of capacitive sensor 210 would be proportional to the respective capacitance at each crossing point. When the sensing surface of the capacitive sensor 210 does not have any electrically conductive objects in contact with it, charge coupling may be substantially uniform across the capacitive matrix of the capacitive sensor 210.

However, when an electrically grounded object (e.g., an object that is electrically grounded relative to the top layer of the capacitive sensor 210), such as a user's finger or fingers, is (are) placed in contact with the sensing surface of the capacitive sensor 210, some of the charge from the capacitors in the contacted area or areas would be shunted to the grounded object or objects. The charge that is shunted to the grounded object or objects would then result in a change (e.g., a decrease) in the apparent capacitance in the area or areas with which the electrically grounded objects or objects are in (electrical) contact with the capacitive sensor 210.

The controller 230 may be configured to detect such changes in apparent capacitance by detecting location-specific reductions in charge coupling (e.g., at the contacted areas) in the capacitive sensor 210. Accordingly, the controller 230, in conjunction with the capacitive sensor 210, may detect the position or positions of a user's finger or fingers on the capacitive sensor 210 and/or movement of a user's finger or fingers across the capacitive sensor 210 based on detection and/or changes in location of such location-specific reductions in charge coupling. Of course, other approaches for implementing the capacitive sensor 210 are possible. For purposes of this disclosure, such detected location-specific reductions in charge coupling corresponding with the position(s) of a user's finger or fingers and/or movement of a user's finger or fingers on the capacitive sensor 210 may be referred to, hereinafter, as "touch data" or "detection information" or "information from the detection by the controller and the capacitive sensor."

In the trackpad 200, the resistive sensor 220 may be disposed below the capacitive sensor 210. The resistive sensor 220 may be implemented using a multi-layer array of resistive elements that includes a top layer of closely-spaced, parallel-arranged resistive elements and a bottom layer of closely-spaced, parallel-arranged resistive elements that are oriented in a perpendicular arrangement with the resistive elements of the top layer. The top layer and the bottom layer of the resistive sensor 220 may be separated by a compressible membrane layer, such as a spacer matrix or dot matrix.

In such an approach, the controller 230 may be configured to sequentially apply a direct current (DC) signal (e.g., a DC voltage) between resistive elements of the resistive sensor 220. The controller in conjunction with the resistive sensor 220 is configured to measure an amount of force applied by measuring a voltage conducted through the resistive sensor layers. The amount of voltage that is present through the resistive elements at each crossing point of elements in the top layer and the elements in the bottom layer would be proportional to the respective voltage at each crossing point. When the resistive sensor 220 is not displaced (e.g., at one or more locations) by an object or objects (e.g., a user's finger or fingers) applying pressure to the surface of the trackpad 200, voltage across the resistive sensor 220 may be substantially uniform across its resistive matrix.

However, when pressure is applied at one or more locations on the surface of the trackpad 200, this pressure may cause location-specific displacement of the resistive sensor 220 at a location or locations that is (are) coincident with the location or locations where such pressure is applied. Such location-specific displacement of the resistive sensor 220 may result in corresponding location-specific changes in voltage in the resistive sensor 220. Depending on the particular implementation, such location-specification changes in voltage corresponding with the location or locations at which pressure is applied may be detected (e.g., by the controller 230) as location-specific increases in voltage in the resistive sensor 220.

Figure 4A:
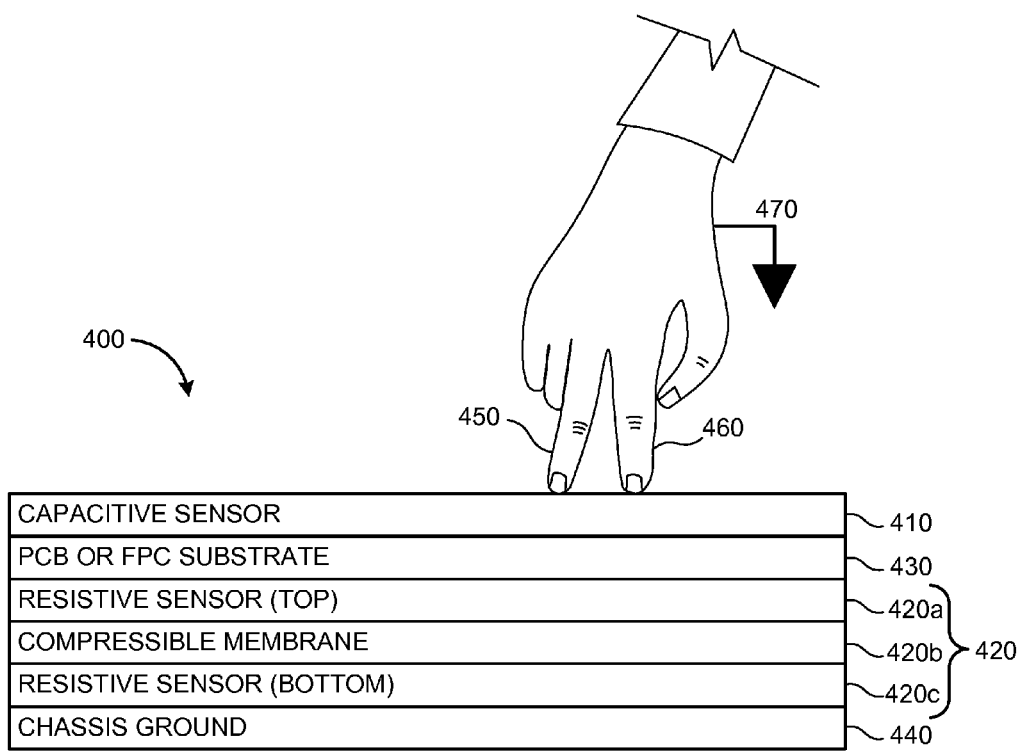
FIGS. 4A and 4B are diagrams illustrating operation of a pressure-sensitive trackpad apparatus in accordance with an example implementation.
Figure 4B:
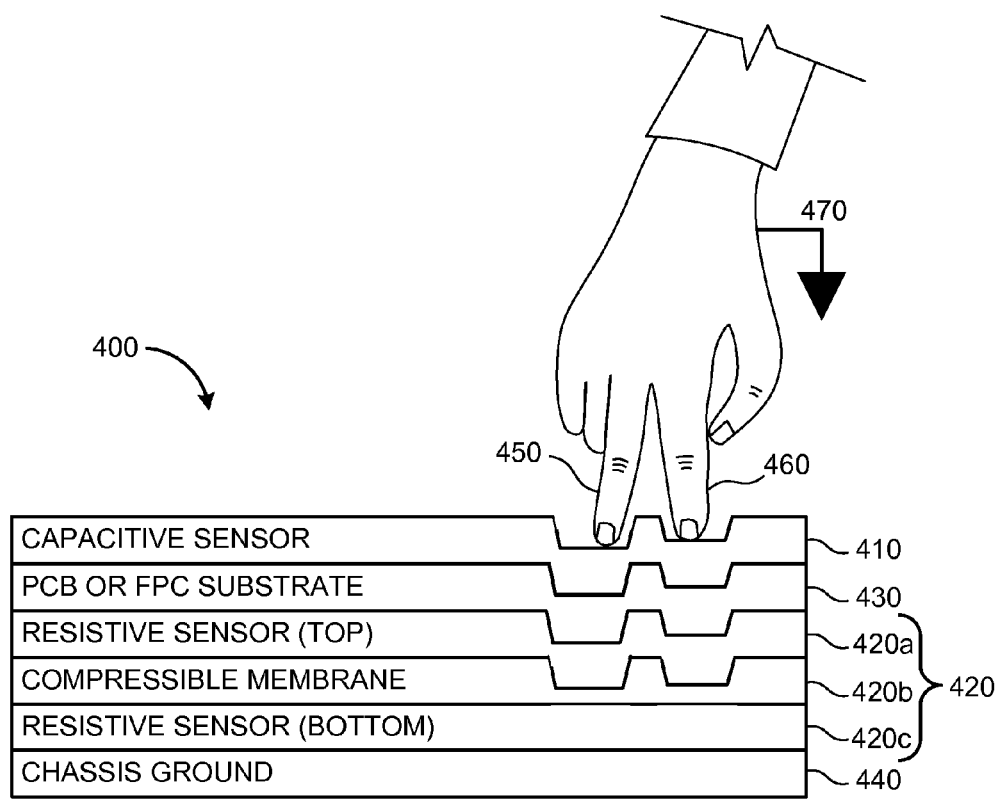

For instance, such location-specific changes in voltage in the resistive sensor 220 may be detected as location-specific increases in voltage (such as in the implementation shown in FIGS. 4A and 4B). The implementations illustrated in FIGS. 4A and 4B will be described in further detail below. For purposes of this disclosure, such detected location-specific changes in voltage resulting from pressure applied to one or more locations on a trackpad surface may be referred to, hereinafter, as "pressure data" or "force data" or "detection information" or "information from the detection by the controller and the resistive sensor."

In the trackpad apparatus 200 shown in FIG. 2A, the controller 230 may implemented in a number of manners. For instance, the controller 230 may be implemented using a general purpose programmable processor or controller. In other implementations, the controller 230 may be implemented using an application specific integrated circuit. In still other approaches, the controller 230 may be implemented using firmware and/or software in the form of machine readable instructions that may be executed by a general purpose processor or controller. The controller 230 may also be implemented using a combination of the techniques discussed above, or may be implemented using other techniques and/or devices.

The controller 230 may be configured to generate and coordinate detection scans of the capacitive sensor 210 and the resistive sensor 220 simultaneously or nearly simultaneously. Both sensors, the capacitive sensor 210 and the resistive sensor 220, function independent of one another. As discussed above, the controller 230 applies an AC signal to the capacitive sensor 210 and a DC signal to the resistive sensor 220, so there is no risk of interference between the signals. The signals from the capacitive sensor 210 can be measured independently from the signals from the resistive sensor 220. Similarly, the signals from the resistive sensor 220 can be measured independently from the signals from the capacitive sensor 210.

In an example implementation, the controller 230 may use the pattern matching/rejection criteria 240 (which is referred to, hereinafter, as pattern filtering criteria 240) to filter touch data and pressure data received from, respectively, the capacitive sensor 210 and the resistive sensor 220. Examples of such criteria are described below with respect to FIG. 5.

Briefly, however, the controller 230 may be configured to resolve one or more geometric patterns corresponding with touch data received from the capacitive sensor 210. For instance, if a user places two fingers in contact with the capacitive sensor 210, the controller 230 may resolve respective geometric patterns associated with each of the user's fingers that are in contact with the capacitive sensor 210 from touch data (e.g., location-specific reductions in charge coupling) corresponding with each of the user's fingers. The controller 230 may be further configured to compare the resolved geometric patterns with the pattern filtering criteria 240 and accept or reject the touch data (or portions of the touch data) based on that comparison.

Such an approach may allow the trackpad apparatus 200 to reject touch data that may be inadvertent or undesirable to use when interacting with a GUI. For example, the pattern filtering criteria 240 may be used to reject touch data that results from a user resting his or her palm, or the side of his or her hand on the trackpad 200. Further, the pattern filtering criteria 240 may also be used to accept touch data with certain patterns, such as patterns that correspond with a user's fingertip or fingertips. The controller 230 may also be configured to filter pressure-data in a similar fashion, e.g., by resolving geometric patterns in the pressure data and comparing those resolved patterns with the pattern filtering criteria 240.

In other implementations, the controller 230 may be configured to correlate touch data with pressure data and filter the pressure data based on both the geometric patterns resolved from the touch data and the pattern filtering criteria 240. In such an approach, if the controller 230 identifies pressure data that does not have corresponding touch data (e.g., a coincident location), that pressure data may be filtered out and not provided to a corresponding computing device to affect interaction with a GUI. Also, in such an implementation, pressure data that does have corresponding touch data may be further filtered by applying geometric patterns resolved from the touch data (e.g., at coincident location(s)) and the pattern filtering criteria 240 to the pressure data. In one example implementation, a top surface of the trackpad 200 may be divided into a plurality of regions. The controller 230 may be configured to determine the locations of one or more objects on the top surface by using detections by the capacitive sensor 210 in one or more of the regions to filter the detections with the resistive sensor 220 in the same regions.

The controller 230 may also be configured to detect movement of one or more electrically conductive objects (e.g., a user's finger or fingers) across the top surface of the trackpad apparatus based on movement of the detected location-specific reductions in charge coupling in the capacitive touch-sensing pattern. For instance, the controller 230 may be configured to compare current touch data with previous touch data in order to detect such movement. In like fashion, the controller 230 may also be configured to detect one or more objects applying pressure and moving across the top surface of the trackpad apparatus based on changes in pressure data. For example, the controller 230 may be configured to compare current pressure data with previous pressure data to detect such movement. In such approaches, filtered pressure data may be used to indicate mouse clicks, or may be used to indicate other desired interactions with a GUI, thus allowing a user to interact with objects in a GUI (e.g., select objects, launch programs from icons and/or move objects) without having to use separate buttons.

Figure 2B:
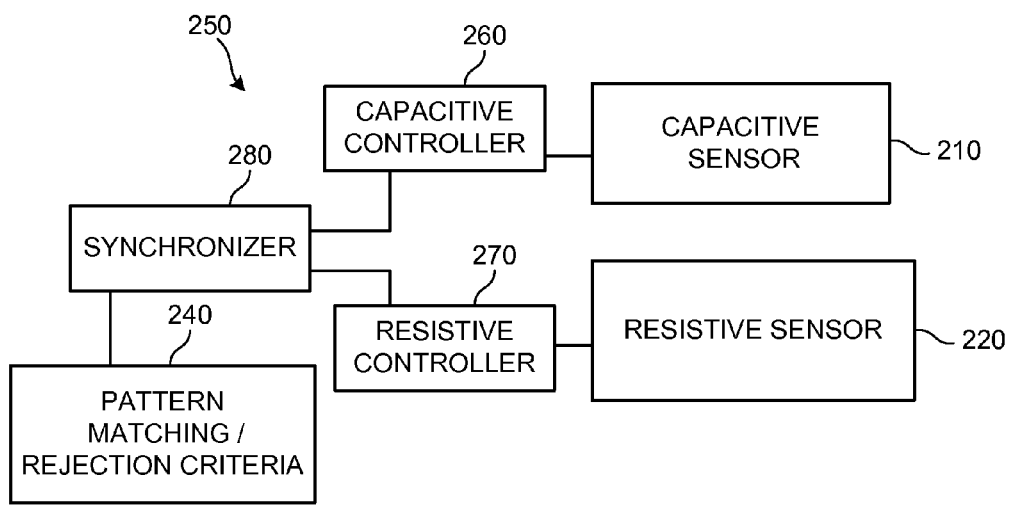
FIG. 2B is a block diagram illustrating a pressure-sensitive trackpad apparatus in accordance with an example implementation.

Referring to FIG. 2B, an example trackpad 250 is illustrated. The trackpad 250 may be implemented, for example, in the computing device 100 as the trackpad apparatus 130 and in the computing device 150 as the keyboard and trackpad apparatus 170. Of course, the trackpad 250 may be implemented in conjunction with other computing devices and the computing devices 100 and 150 may include pressure-sensitive trackpads having other configurations. The trackpad 250 may function similar to the trackpad 200 of FIG. 2A with a difference being that the trackpad 250 includes a capacitive controller 260 and a resistive controller 270 in place of the single controller 230 of FIG. 2A. The trackpad 250 also includes a synchronizer 280 to synchronize the detection scans from both the capacitive controller 260 and the resistive controller 270. The capacitive controller 260 and the resistive controller 270 divide the functionality of the controller 230 of FIG. 2A with the capacitive controller 260 operatively coupled to the capacitive sensor 210 and the resistive controller 270 operably coupled to the resistive sensor 220. The capacitive controller 260 is configured to work in conjunction with the capacitive sensor 210 in the same manner controller 230 worked in conjunction with the capacitive sensor 210, as described above with respect to FIG. 2A. Similarly, the resistive controller 270 is configured to work in conjunction with the resistive sensor 220 in the same manner controller 230 worked in conjunction with the resistive sensor 220, as described above with respect to FIG. 2A.

The synchronizer 280 is configured to coordinate with the capacitive controller 260 and the resistive controller 270 to run detection scans simultaneously or nearly simultaneously such that the scans both complete at substantially a same time in order to run efficiently.

Figure 3:
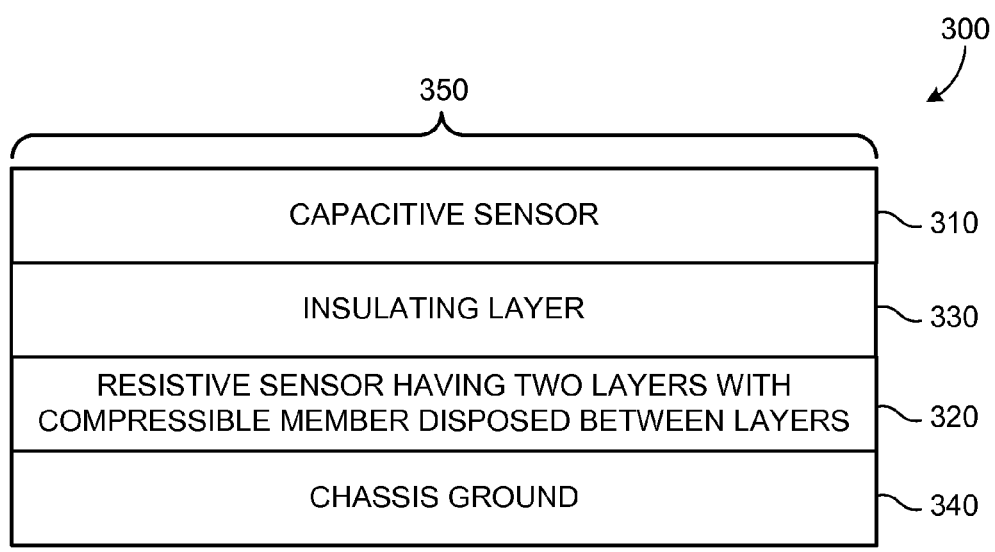
FIG. 3 is a diagram illustrating a pressure-sensitive trackpad apparatus in accordance with an example implementation.

FIG. 3 is a diagram illustrating a pressure-sensitive trackpad apparatus 300 in accordance with an example implementation. The trackpad 300 shown in FIG. 3 illustrates an example structure that may be used to implement a pressure-sensitive trackpad apparatus. For instance, the structure of the trackpad 300 may be used to implement the trackpad 200 shown in FIG. 2A and the trackpad 250 shown in FIG. 2B. Accordingly, for illustrative purposes, like elements of the trackpad 300 are referenced with 300 series reference numbers corresponding with the 200 series reference number used in FIGS. 2A and 2B. Also, while not shown in FIG. 3, the trackpad 300 may be coupled with a controller in like fashion as shown for the controller 230 in the trackpad 200 illustrated in FIG. 2A or the controllers 260 and 270 and synchronizer 280 in the trackpad 250 illustrated in FIG. 2B.

As illustrated in FIG. 3, the trackpad 300 includes a capacitive sensor 310, a resistive sensor 320, an optional insulating layer 330 that is disposed between the capacitive sensor 310 and the resistive sensor 320, and a chassis ground 340. The upper surface 350 of the trackpad 300 may operate as a tactile sensing surface for the trackpad 300 to gather touch data, such as in the manners described herein.

In the trackpad 300, the capacitive sensor 310 and the resistive sensor 320 may be implemented and operate in a similar fashion as was discussed above with respect to the capacitive sensor 210 and the resistive sensor 220 of the trackpads 200 and 250 shown in FIGS. 2A and 2B. Accordingly, for purposes of brevity and clarity, the entirety of the details of the capacitive sensor 210 and the resistive sensor 220 are not repeated again here with respect to the capacitive sensor 310 and the resistive sensor 320. The capacitive sensor 310 may be a single layer sensor or a multi-layer sensor.

As is indicated in FIG. 3, the resistive sensor 320 may be implemented with two layers disposed on either side of a compressible membrane. The particular arrangement of the resistive matrix and the compressible membrane of the resistive sensor 320 will depend on the particular implementation. One such implementation is illustrated in FIGS. 4A and 4B, as discussed further below. Of course, other arrangements are possible.

In the trackpad 300, the stiffness (e.g., material) of each of the capacitive sensor 310, the insulating layer 330, the resistive layer(s) of the resistive sensor 320, and the compressible membrane of the resistive sensor 320 may be selected such that the compressible membrane is the first to displace when pressure is applied to the surface 350, such as by a user's finger or fingers. The chassis ground 340 may be implemented using a metal frame, such as previously described. In such approaches, the chassis ground would be highly resistant to being displaced as a result of pressure applied to the surface 350 of the trackpad 300.

FIGS. 4A and 4B are diagrams illustrating operation of a pressure-sensitive trackpad apparatus 400 in accordance with an example implementation. The trackpad 400 shown in FIGS. 4A and 4B illustrates another example structure of a pressure-sensitive trackpad apparatus that may be used to implement the trackpads 200, 250 and 300 shown, respectively, in FIGS. 2A, 2B and 3. Accordingly, for illustrative purposes, like elements of the trackpad 400 are referenced with 400 series reference numbers corresponding with the 200 and 300 series reference numbers used in FIGS. 2A, 2B and 3. While not shown in FIGS. 4A and 4B, the trackpad 400 may be coupled with a controller in like fashion as shown for the controller 230 in the trackpad 200 illustrated in FIG. 2A or multiple controllers 260 and 270 and synchronizer 280 illustrated in FIG. 2B.

As illustrated in FIGS. 4A and 4B, the trackpad 400 includes a capacitive sensor 410, a resistive sensor 420, a PCB or a flexible printed circuit substrate (FPC) substrate 430 that is disposed between the capacitive sensor 410 and the resistive sensor 420, and a chassis ground 440. In the trackpad 400, the resistive sensor 420 includes a resistive sensor top layer 420a, a compressible membrane 420b that is disposed below the resistive sensor top layer 420a and a resistive sensor bottom layer 420c.

The compressible membrane 420b may be implemented using, for example, silicone, synthetic polymers, such as polyethylene terephthalate (PET), air, or a combination these or other materials. For instance, in an example implementation of the trackpad 400, the compressible membrane 420b may include a matrix of PET spacer dots, which creates a gap between the resistive sensor top 420a and the resistive sensor bottom 420c, while the rest of the compressible membrane 420b is air. The PCB substrate 430 may be implemented using a glass-reinforced epoxy laminate PCB substrate, such as FR-4, for example. The specific materials used will, of course, depend on the particular implementation.

As was discussed with respect to the trackpad 300, the stiffness (materials) of each of the capacitive sensor 410; the PCB substrate 430; the resistive sensor layers 420a and 420c; and the compressible membrane 420b may be selected such that the compressible membrane 420b is the first to displace when pressure is applied to the top surface of the trackpad 400, such as by a user's finger or fingers. Further, the chassis ground 440 may be implemented in like fashion as was discussed above with respect to the chassis ground 340, e.g., so as to be resistant to displacement.

In the trackpad 400, the capacitive sensor 410 and the resistive sensor 420 may be implemented and operate in a similar fashion as was discussed above with respect to the capacitive sensor 210 and the resistive sensor 220 of the trackpads 200 and 250 shown in FIGS. 2A and 2B. Accordingly, for purposes of brevity and clarity, the entirety of the details of the capacitive sensor 210 and the resistive sensor 220 are not repeated again here with respect to the capacitive sensor 410 and the resistive sensor 420.

In FIGS. 4A and 4B, a user's fingers 450 and 460 are illustrated as being in contact (e.g., electrical contact) with a top surface of the trackpad 400. The fingers 450 and 460 are also shown as being connected to an electrical ground 470, where the user would provide an electrical ground with respect to the top surface of the trackpad 400.

In like fashion as previously described, the user's fingers 450 and 460 may shunt charge away from the capacitive sensor 410 to the electrical ground 470, thereby changing the apparent capacitance of the capacitive sensor 410 where it is contacted by the user's fingers 450 and 460. A controller, such as the controller 230 (or controller 260 of FIG. 2B), (not shown in FIGS. 4A and 4B) coupled with the trackpad 400 may detect such changes in apparent capacitance (as touch data) by detecting corresponding reductions in charge coupling in the capacitive sensor 410 where it is contacted by the user's fingers 450 and 460. Additionally, movement of the user's fingers 450 and 460 across the surface of the trackpad apparatus 400 may be detected using the techniques described here, such as those that were discussed above with respect to FIGS. 2A and 2B.

As shown in FIG. 4A, the user's fingers 450 and 460 are not applying pressure to the surface of the trackpad 400. In this situation, voltage in the resistive sensor 420 would be substantially uniform across its resistive matrix.

The compressible membrane 420b is disposed between the resistive layers 420a and 420b of the resistive sensor 420 of the trackpad 400. Therefore, in this embodiment, the compressible membrane 420b is part of the resistive sensor 420.

As shown in FIG. 4A, the fingers 450 and 460 are not applying pressure to the surface of the trackpad 400. In this situation, voltage across the resistive sensor 420 would be substantially uniform across its voltage matrix.

As shown in FIG. 4B, pressure is being applied to the surface of the trackpad 400 by the fingers 450 and 460, with more pressure being applied by the finger 450 than by the finger 460. As illustrated, the pressure by the fingers 450 and 460 results in corresponding displacements of the compressible membrane 420b, the resistive layer 420a, the PCB substrate 430 and the capacitive sensor 410. As discussed above, the stiffness of each of these layers may be selected such that the compressible membrane 420b is the first displace when pressure is applied to the surface of the trackpad 400.

In this situation, the displacements of the resistive layer 420a and the compressible membrane 420b under the fingers 450 and 460 will cause contact with the resistive layer 420c. The contact of the resistive layers 420a and 420c will cause respective location-specific increases in voltage (i.e., a voltage conduction) of the resistive sensor 420 where the displacements occur. A controller, such as the controller 230 shown in FIG. 2A (or controller 270 of FIG. 2B), coupled with the trackpad 400 may detect such increases in voltage as pressure data. Movement of the fingers 450 and 460 across the surface of the trackpad 400 while applying pressure may be detected from such pressure data using the techniques described herein. Also, pressure data and touch data for the trackpad apparatus 400 may be filtered using the techniques described herein, such as discussed with reference to FIG. 2A, FIG. 2B and FIG. 5, for example.

A controller coupled with the trackpad 400 may also be configured to determine the respective amount of pressure applied by each of the fingers 450 and 460 to the surface of the trackpad 400. For example, because the finger 450 is applying more pressure than the finger 460 and causes a larger displacement, the location-specific increase in voltage in the resistive sensor 420 associated with the displacement from the finger 450 will be greater than the voltage conduction in the resistive sensor 420 associated with the displacement from the finger 460.

The trackpad apparatus 400, using a controller, may be configured to determine an amount of pressure applied by each of the fingers 450 and 460, from corresponding pressure data. For instance, the pressure amounts may be determined based on respective amounts of location-specific increases in voltage in the resistive sensor 420. Such determinations may be provided to a computing system, such as the computing system 100 or 150, by the trackpad 400 (e.g., using a controller) and may affect different actions in a GUI based on the amount of pressure applied. For example, a first amount of pressure may cause an item to be selected in a GUI and a second amount of pressure (e.g., greater than the first amount) may cause the item to be opened, such as using a default program or by running a program associated with an icon, as some examples. The amount of pressure also may be used to distinguish between selection of keys in a keyboard versus tracking gestures to control a cursor such as with combined keyboard and trackpad 170 of FIG. 1B. For example, when an amount of pressure as detected by the resistive sensor meets or exceeds a particular threshold pressure, then a keyboard action may be registered instead of a tracking gesture. Of course, such indications of an amount of pressure applied may be used in a number of other ways depending on the particular implementation and/or situation.

Figure 5:
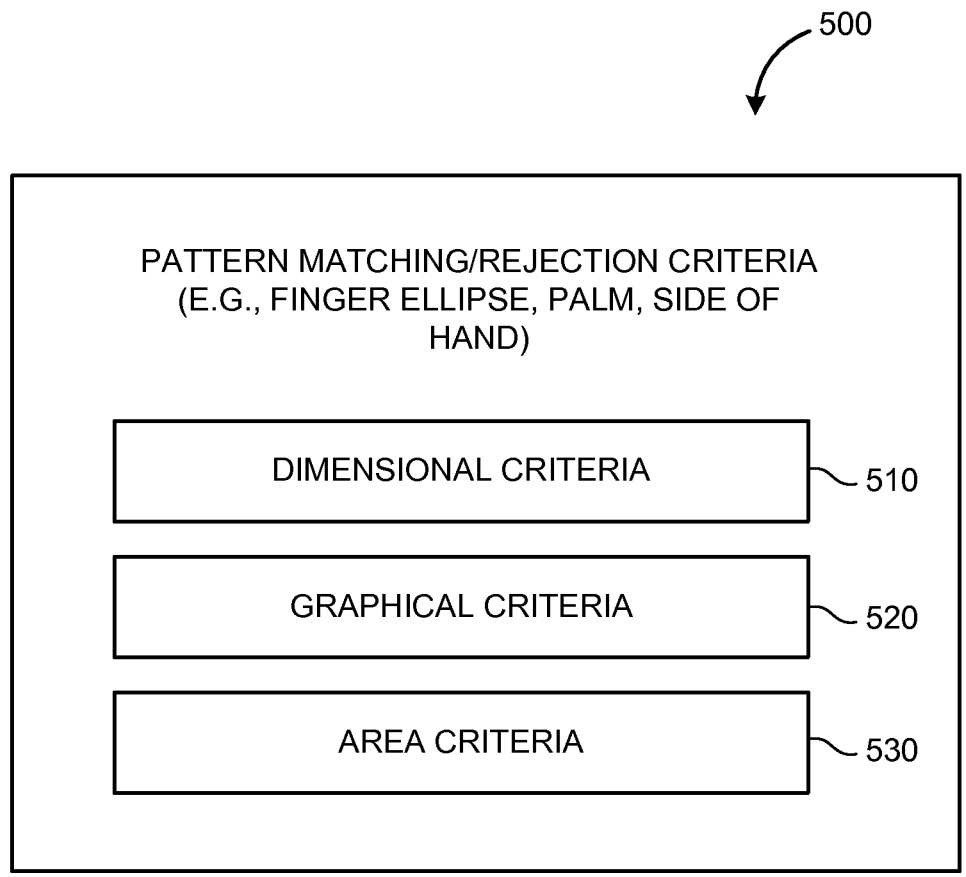
FIG. 5 is a diagram illustrating pattern matching and rejection criteria in accordance with an example implementation.

FIG. 5 is a diagram illustrating pattern matching and rejection (pattern filtering) criteria 500 in accordance with an example implementation. In an example implementation, the pattern filtering criteria 500 may be used to implement the pattern filtering criteria 240 shown in FIGS. 2A and 2B. For instance, the pattern filtering criteria 500 may be used to filter touch data and/or pressure data for a trackpad apparatus using the techniques that have been described herein, such as with respect to FIGS. 2A and 2B. As indicated in FIG. 5, the pattern filtering criteria 500 may define acceptable patterns, such as finger ellipses which would not be filtered out of touch data and/or pressure data received by a trackpad apparatus. The pattern filtering criteria 500 may also define unacceptable patterns, such as palm or side of hand patterns, which would be filtered out of touch data and/or pressure data received by a trackpad apparatus.

As shown in FIG. 5, the pattern filtering criteria 500 includes dimensional criteria 510, graphical criteria 520 and area criteria 530. In such an approach, the dimensional criteria 510 may define dimensions for touch data and/or pressure data that should be accepted, or may define dimensions for touch data and/or pressure data that should be rejected. In some implementations, the dimensional criteria 510 may define both pattern dimensions that should be accepted and pattern dimensions that should be rejected. The graphical criteria 520 may define geometric patterns in a graphical form, which may include graphical patterns that should be accepted and/or graphical patterns that should be rejected. The area criteria 530 may define patterns that should be accepted and/or patterns that should be rejected based on a respective area of a given pattern. For instance, in one implementation, an area threshold may be defined in the area criteria 530. In such an approach, touch data patterns and/or pressure data patterns with an area less than the area threshold may be accepted and patterns with an area greater than the area threshold may be rejected. Of course, other approaches for defining pattern filtering criteria are possible.

Figure 6:
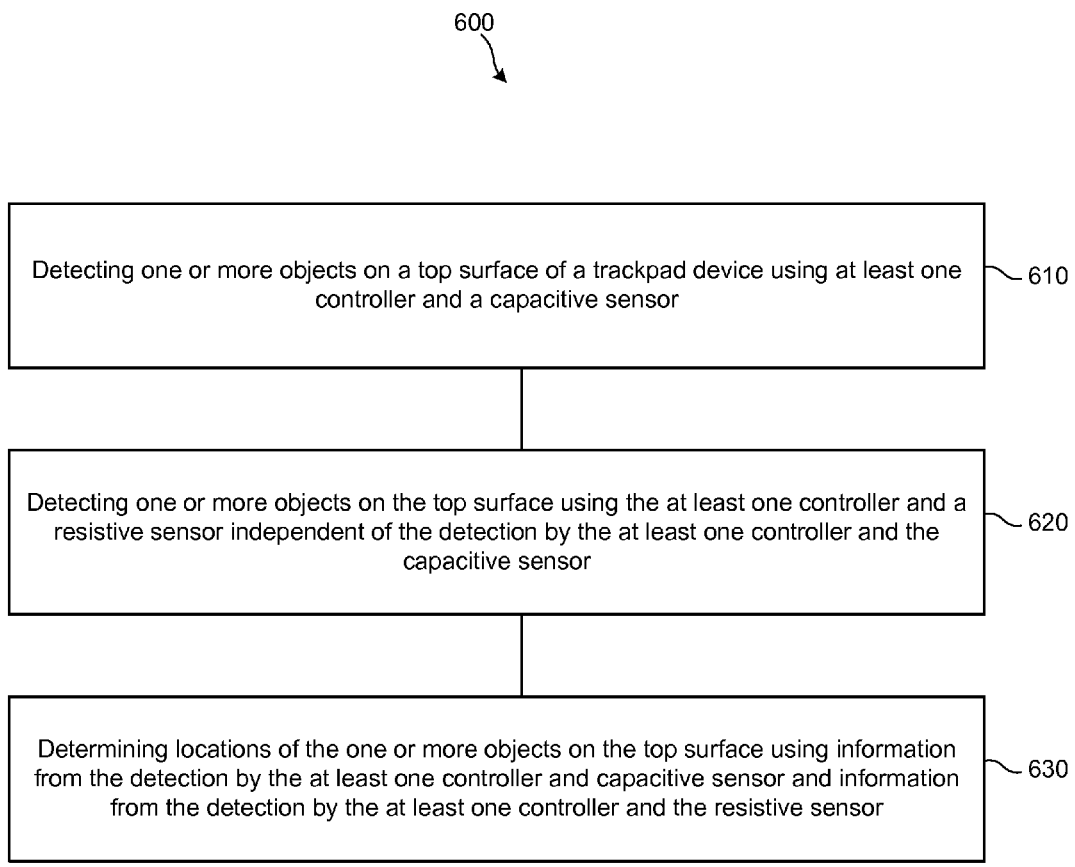
FIG. 6 is an example flow diagram illustrating example operations of the trackpad apparatus of FIGS. 2A, 2B, 3, 4A and 4B as implemented in example computing devices of FIGS. 1A and 1B.

FIG. 6 is an example flow diagram illustrating example operations of the trackpad apparatus of FIGS. 2A, 2B, 3, 4A and 4B as implemented in example computing devices of FIGS. 1A and 1B. FIG. 6 includes a process 600. The process 600 includes detecting one or more objects on a top surface of a trackpad device using at least one controller and a capacitive sensor (610). For example, the capacitive sensor 210 and the controller 230 may be used to detect one or more objects on a top surface of trackpad 200.

Process 600 includes detecting one or more objects on the top surface using the at least one controller and a resistive sensor independent of the detection by the at least one controller and the capacitive sensor (620). For example, independent of detecting objects using the capacitive sensor 210 and controller 203, the resistive sensor 220 and controller 230 may be used to detect one or more objects on the top surface of the trackpad 200.

Process 600 includes determining locations of the one or more objects on the top surface using information from the detection by the at least one controller and capacitive sensor and information from the detection by the at least one controller and the resistive sensor (630). For example, the controller 230 may be configured to determine the locations of the one or more objects on the top surface of the trackpad 200 using detection information from both the capacitive sensor 210 and the resistive sensor 220. The detection information from both the capacitive sensor 210 and the resistive sensor 220 also may be used to distinguish between different types of gestures or keyboard actions. For example, the information may be used to distinguish between keyboard actions and tracking gestures (e.g., on a combined keyboard and trackpad such as keyboard and trackpad 170 of FIG. 1B.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A trackpad device, comprising:
   a top surface;
   a capacitive sensor operably coupled to the top surface and that is configured to obtain touch data;
   a resistive sensor disposed below the capacitive sensor and that is configured to obtain pressure data, wherein the resistive sensor includes:

a top resistive layer, a bottom resistive layer, and a spacer matrix disposed between the top resistive layer and the bottom resistive layer; and at least one controller operably coupled to the capacitive sensor and to the resistive sensor, wherein:

the at least one controller and both the capacitive sensor and the resistive sensor are configured to detect one or more objects on the top surface using independent and substantially simultaneous detection scans, wherein the detection by the resistive sensor is independent of the detection by the capacitive sensor and the resistive sensor obtains the pressure data, which includes location-specific change information, by measuring a force applied by the one or more objects using the top resistive layer, the bottom resistive layer and the spacer matrix, and the at least one controller is configured to correlate the touch data and the pressure data to determine locations of the one or more objects on the top surface, wherein uncorrelated touch data and pressure data is rejected by the at least one controller, correlated touch data and pressure data that is further filtered by resolving geometric patterns in the pressure data and comparing the resolved geometric patterns with pattern filtering criteria is rejected by the at least one controller, correlated touch data and pressure data that is not rejected by the resolved geometric pattern filtering is used by the at least one controller to detect movement of the one or more objects by comparing current pressure data with previous pressure data and by comparing current touch data with previous touch data, correlated touch data and pressure data that is not rejected by the resolved geometric pattern filtering, where the current pressure data exceeds a first pressure threshold, is used to cause selection of an item in a user interface, and correlated touch data and pressure data that is not rejected by the resolved geometric pattern filtering, where the current pressure data exceeds a second pressure threshold, is used to cause opening of the item in the user interface.

2. The trackpad device of claim 1, wherein the at least one controller includes:

a first controller that is operably coupled to the capacitive sensor; and a second controller that is operably coupled to the resistive sensor, wherein the first controller is different from the second controller.

3. The trackpad device of claim 2, further comprising a synchronizer that is operably coupled to the first controller and the second controller, the synchronizer being configured to synchronize detection scans from the first controller and the capacitive sensor with detection scans from the second controller and the resistive sensor.

4. The trackpad device of claim 3, wherein the synchronizer is configured to run the detection scans from the first controller and the capacitive sensor simultaneously with the detection scans from the second controller and the resistive sensor.

5. The trackpad device of claim 1, wherein:

the top surface is divided into a plurality of regions; and the at least one controller is configured to determine the locations of the one or more objects on the top surface by using the detections with the capacitive sensor in one or more of the regions to filter the detections with the resistive sensor in the same regions.

6. The trackpad device of claim 1, wherein the capacitive sensor is a single layer capacitive sensor.

7. The trackpad device of claim 1, wherein the capacitive sensor is a multi-layer capacitive sensor.

8. The trackpad device of claim 1, wherein:

the trackpad device includes both a trackpad area and a keyboard area; and the at least one controller is configured to use the capacitive sensor and the resistive sensor to distinguish between keystrokes on the keyboard area and movement on the trackpad area.

9. The trackpad device of claim 8, wherein at least a portion of the trackpad area and the keyboard area overlap.

10. A computing device, comprising:

a display device, the computing device being configured to render a graphical user interface (GUI) on the display device;

a trackpad apparatus configured to facilitate user interaction with the GUI, the trackpad apparatus comprising:

a top surface;

a capacitive sensor operably coupled to the top surface and that is configured to obtain touch data;

a resistive sensor disposed below the capacitive sensor and that is configured to obtain pressure data, wherein the resistive sensor includes:

a top resistive layer, a bottom resistive layer, and a spacer matrix disposed between the top resistive layer and the bottom resistive layer; and at least one controller operably coupled to the capacitive sensor and to the resistive sensor, wherein:

the at least one controller and both the capacitive sensor and the resistive sensor are configured to detect one or more objects on the top surface using independent and substantially simultaneous detection scans, wherein the detection by the resistive sensor is independent of the detection by the capacitive sensor and the resistive sensor obtains the pressure data, which includes location-specific change information, by measuring a force applied by the one or more objects using the top resistive layer, the bottom resistive layer and the spacer matrix, and the at least one controller is configured to correlate the touch data and the pressure data to determine locations of the one or more objects on the top surface, wherein uncorrelated touch data and pressure data is rejected by the at least one controller, correlated touch data and pressure data that is further filtered by resolving geometric patterns in the pressure data and comparing the resolved geometric patterns with the pattern filtering criteria is rejected by the at least one controller, correlated touch data and pressure data that is not rejected by the resolved geometric pattern filtering is used by the at least one controller to detect movement of the one or more objects by comparing current pressure data with previous pressure data and by comparing current touch data with previous touch data, correlated touch data and pressure data that is not rejected by the resolved geometric pattern filtering, where the current pressure data exceeds a first pressure threshold, is used to cause selection of an item in a user interface, and correlated touch data and pressure data that is not rejected by the resolved geometric pattern filtering, where the current pressure data exceeds a second pressure threshold, is used to cause opening of the item in the user interface.

11. The computing device of claim 10, wherein:

the at least one controller and the resistive sensor are collectively further configured to, for one or more corresponding locations on the top surface of the trackpad apparatus, detect a respective amount of pressure applied to the top surface of the trackpad apparatus; and user interaction with the GUI is further based on the detected respective amounts of pressure for the one or more corresponding locations on the top surface of the trackpad apparatus.

12. The computing device of claim 10, wherein the at least one controller includes:

a first controller that is operably coupled to the capacitive sensor; and a second controller that is operably coupled to the resistive sensor, wherein the first controller is different from the second controller.

13. The computing device of claim 12, further comprising a synchronizer that is operably coupled to the first controller and the second controller, the synchronizer being configured to synchronize detection scans from the first controller and the capacitive sensor with detection scans from the second controller and the resistive sensor.

14. The computing device of claim 13, wherein the synchronizer is configured to run the detections scans from the first controller and the capacitive sensor simultaneously with the detection scans from the second controller and the resistive sensor.

15. The computing device of claim 10, wherein:

the trackpad apparatus includes both a trackpad area and a keyboard area; and the at least one controller is configured to use the capacitive sensor and the resistive sensor to distinguish between keystrokes on the keyboard area and movement on the trackpad area.

16. The computing device of claim 15, wherein at least a portion of the trackpad area and the keyboard area overlap.

17. A method, comprising:

detecting one or more objects on a top surface of a trackpad device using at least one controller and both a capacitive sensor that is configured to obtain touch data and a resistive sensor that is configured to obtain pressure data independent of the capacitive sensor using independent and substantially simultaneous detection scans, wherein the resistive sensor obtains the pressure data, which includes location-specific change information, by measuring a force applied by the one or more objects using the resistive sensor including a top resistive layer, a bottom resistive layer and a spacer matrix disposed between the top resistive layer and the bottom resistive layer; and determining locations of the one or more objects on the top surface by correlating the touch data and the pressure data, wherein uncorrelated touch data and pressure data is rejected by the at least one controller, correlated touch data and pressure data that is further filtered by resolving geometric patterns in the pressure data and comparing the resolved geometric patterns with the pattern filtering criteria is rejected by the at least one controller, correlated touch data and pressure data that is not rejected by the resolved geometric pattern filtering is used by the at least one controller to detect movement of the one or more objects by comparing current pressure data with previous pressure data and by comparing current touch data with previous pressure data, correlated touch data and pressure data that is not rejected by the resolved geometric pattern filtering, where the current pressure data exceeds a first pressure threshold, is used to cause selection of an item in a user interface, and correlated touch data and pressure data that is not rejected by the resolved geometric pattern filtering, where the current pressure data exceeds a second pressure threshold, is used to cause opening of the item in the user interface.

18. The method of claim 17, wherein the trackpad device includes both a trackpad area and a keyboard area, the method further comprising distinguishing between keystrokes on the keyboard area and movement on the trackpad area using the capacitive sensor and the resistive sensor.

* * * * *